(12) United States Patent
Morimoto

(10) Patent No.: US 12,081,712 B2
(45) Date of Patent: Sep. 3, 2024

(54) INFORMATION PROCESSING APPARATUS, METHOD FOR CONTROLLING INFORMATION PROCESSING APPARATUS, AND MEDIUM FOR REDUCING THE NOISE OF A PRINTING APPARATUS

(71) Applicant: CANON KABUSHIKI KAISHA, Tokyo (JP)

(72) Inventor: Hiroaki Morimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,245

(22) Filed: Jun. 6, 2023

(65) Prior Publication Data
US 2023/0403361 A1 Dec. 14, 2023

(30) Foreign Application Priority Data
Jun. 10, 2022 (JP) ................. 2022-094073

(51) Int. Cl.
*H04N 1/00* (2006.01)

(52) U.S. Cl.
CPC ..... *H04N 1/00925* (2013.01); *H04N 1/00352* (2013.01); *H04N 1/00472* (2013.01)

(58) Field of Classification Search
None
See application file for complete search history.

(56) References Cited

U.S. PATENT DOCUMENTS

| | | | |
|---|---|---|---|
| 7,024,363 B1* | 4/2006 | Comerford | G10L 15/22 704/E15.04 |
| 11,780,240 B2* | 10/2023 | Tsukuda | B41J 3/4075 358/1.1 |
| 2009/0109466 A1* | 4/2009 | Yoshikawa | B41J 29/38 358/1.15 |
| 2014/0240756 A1* | 8/2014 | Ganesan | H04W 4/023 358/1.15 |
| 2014/0253949 A1* | 9/2014 | Tsujimoto | H04N 1/00925 358/1.14 |
| 2015/0381934 A1* | 12/2015 | Kondo | H04L 65/403 348/14.09 |
| 2017/0054870 A1* | 2/2017 | Oe | H04B 1/3833 |
| 2018/0277112 A1* | 9/2018 | Kim | G06F 3/167 |
| 2020/0241820 A1* | 7/2020 | Uchino | G06F 3/1204 |
| 2020/0320976 A1* | 10/2020 | Kawano | G10L 15/04 |
| 2020/0321007 A1* | 10/2020 | Stoker | G10L 15/26 |
| 2022/0027110 A1* | 1/2022 | Abe | G06F 3/1232 |
| 2022/0138516 A1* | 5/2022 | Natori | G06K 15/1814 358/1.15 |

FOREIGN PATENT DOCUMENTS

JP 2014142498 A * 8/2014

* cited by examiner

*Primary Examiner* — Akwasi M Sarpong
*Assistant Examiner* — Pawan Dhingra
(74) *Attorney, Agent, or Firm* — Canon U.S.A., Inc. IP Division

(57) ABSTRACT

An information processing apparatus instructs, if an audio input device such as a microphone is in use by the information processing apparatus, a printing apparatus to which a print job is transmitted to operate in a silent mode to reduce operation noise occurring in printing.

10 Claims, 12 Drawing Sheets

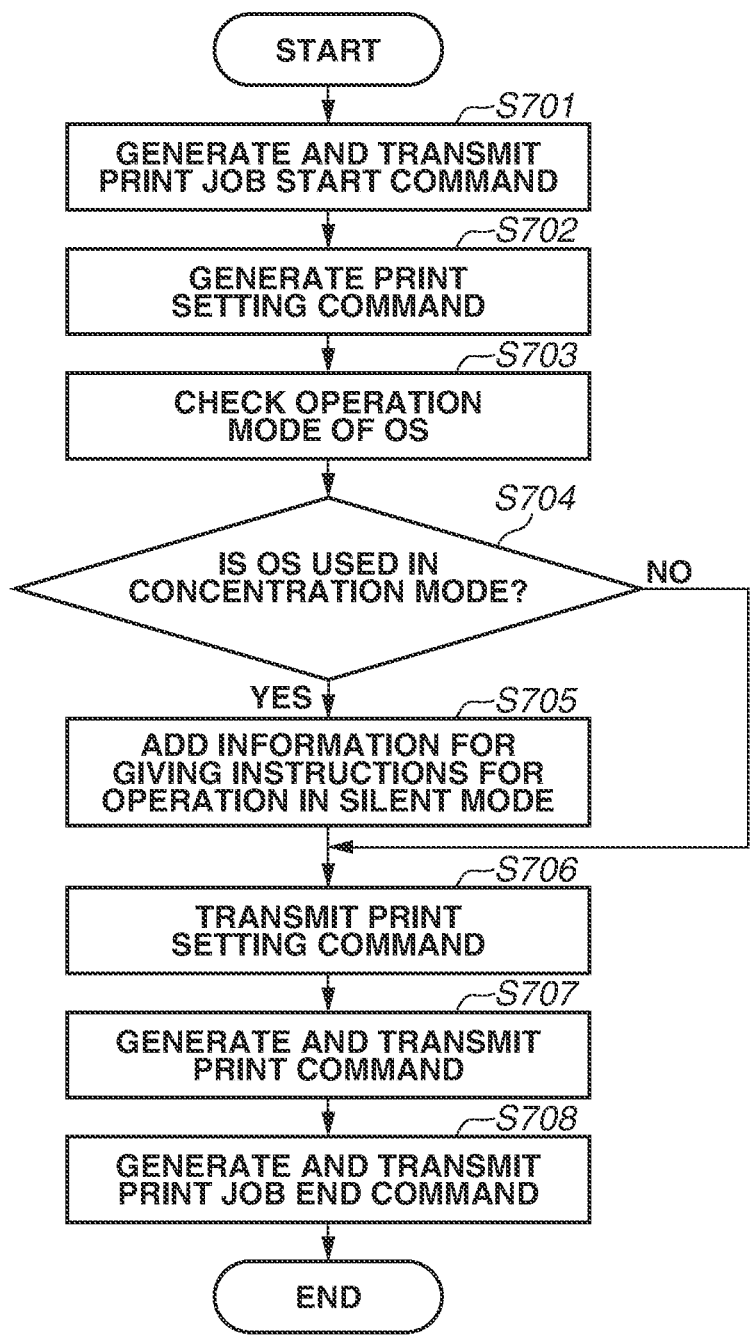

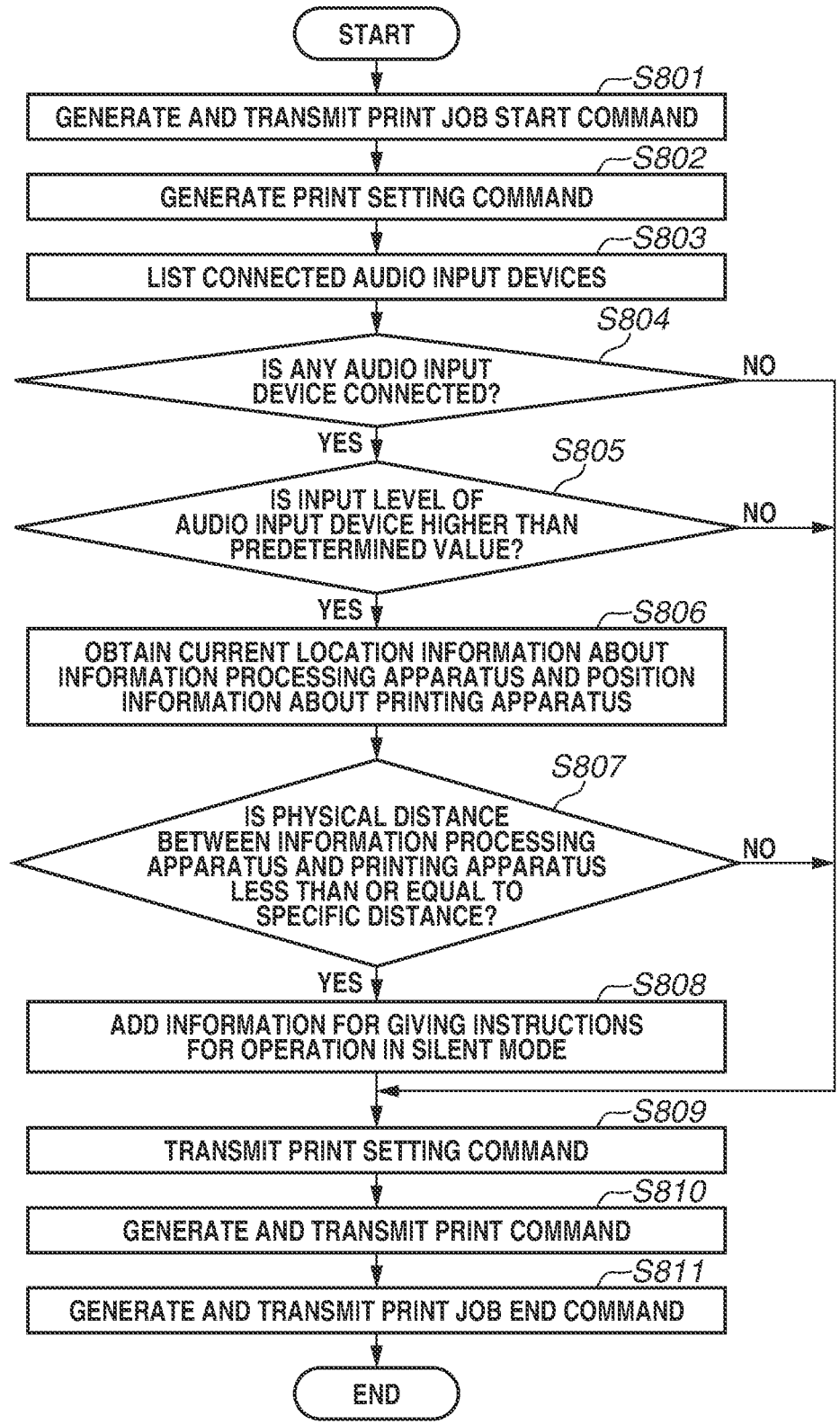

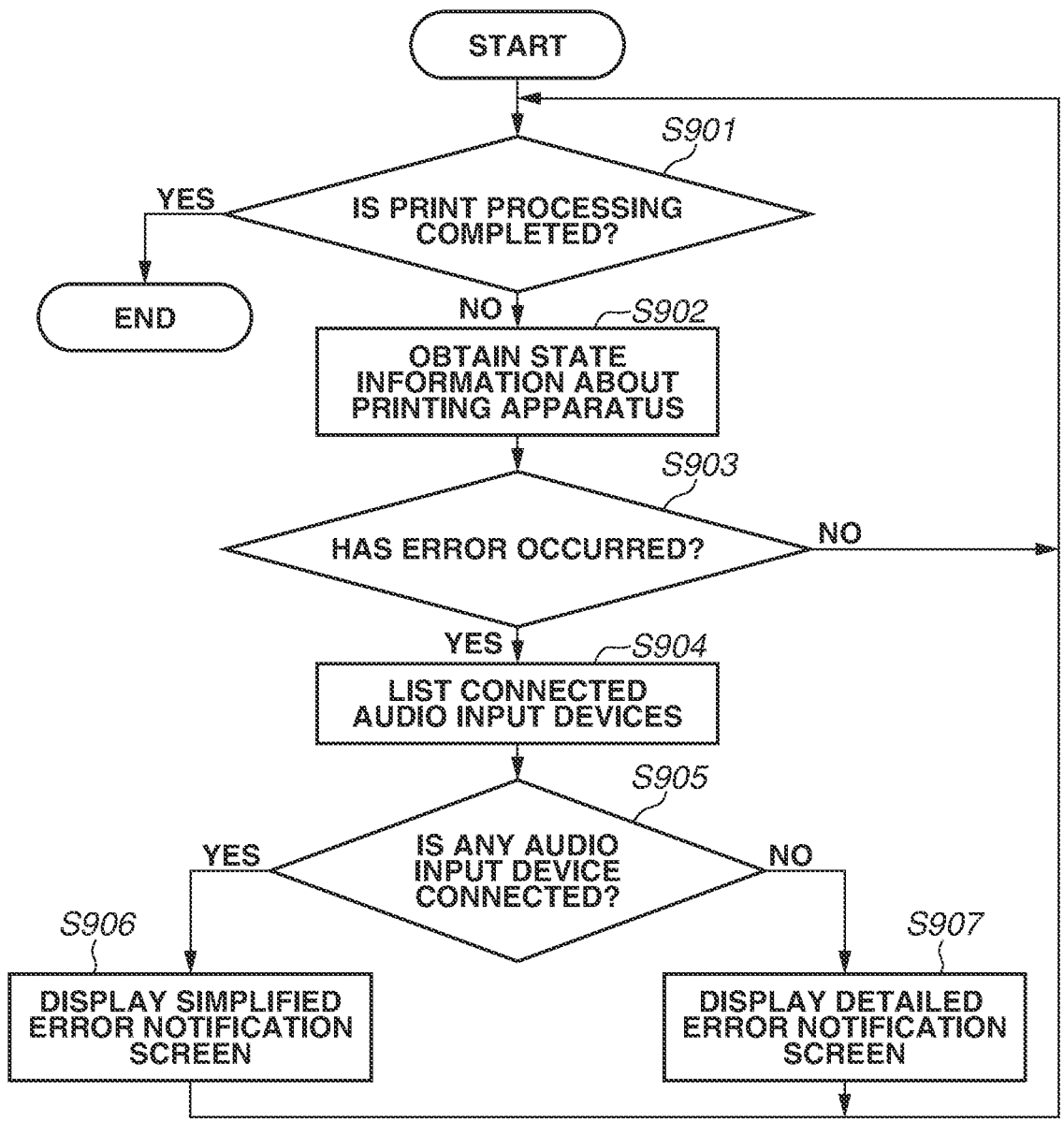

INFORMATION PROCESSING APPARATUS, METHOD FOR CONTROLLING INFORMATION PROCESSING APPARATUS, AND MEDIUM FOR REDUCING THE NOISE OF A PRINTING APPARATUS

BACKGROUND

Field of the Disclosure

The present disclosure relates to an information processing apparatus, a method for controlling an information processing apparatus, and a medium.

Description of the Related Art

Online communication applications, such as https://www.microsoft.com/ja-jp/microsoft-teams/group-chat-software, have been used more and more often in recent years as means to communicate remotely with others. The use of online communication applications enables a conversation with partners at remote locations in real time. Typical online communication applications run on information processing terminals, such as a personal computer (PC), and enable a conversation by transmitting speakers' voice input via audio input devices (e.g., a microphone) connected to the information processing terminals to the communication partners.

An audio input device connected to an information processing apparatus can sometimes collect not only the speaker's voice but ambient sound in the surroundings as well. If an operation noise-generating peripheral device (a printing apparatus in particular) connected to the information processing terminal is operated during a conversation, the operation noise can therefore reach the call partner via the audio input device and disturb the conversation. Japanese Patent Application Laid-Open No. 2014-142498 discusses measures against such an issue.

Japanese Patent Application Laid-Open No. 2014-142498 discusses a technique capable of appropriately reducing operation noise based on ambient noise around a printing apparatus and situations of people nearby.

However, the technique discussed in Japanese Patent Application Laid-Open No. 2014-142498 is based on the premise that the operated peripheral device itself includes a mechanism capable of detecting the intensity of the ambient noise and the presence or absence of people. The technique discussed in Japanese Patent Application Laid-Open No. 2014-142498 is therefore not applicable to peripheral devices that do not include such a mechanism, like ordinary printing apparatuses for home use.

Moreover, if status information about a peripheral device, such as a printing apparatus, is notified by software (e.g., a printer driver) controlling the peripheral device using a dialog during a conversion via an audio input device, the user's concentration on the conversation can be disturbed depending on the notification method.

SUMMARY

Embodiments of the present disclosure are directed to providing a mechanism that can prevent voice communication from being disturbed by operation noise of even a peripheral device, such as an ordinary printing apparatus, having no special mechanism.

According to an aspect of the present disclosure, an information processing apparatus is configured to transmit a print job to a printing apparatus, and the information processing apparatus includes a control unit configured to, if an audio input device is in use by the information processing apparatus, instruct the printing apparatus to which the print job is transmitted to operate in a silent mode to reduce operation noise occurring in printing.

Further features of various embodiments of the present disclosure will become apparent from the following description of exemplary embodiments with reference to the attached drawings.

BRIEF DESCRIPTION OF THE DRAWINGS

FIG. 7 is a flowchart illustrating processing by a graphics driver according to a third exemplary embodiment.

FIG. 8 is a flowchart illustrating processing by a graphics driver according to a fourth exemplary embodiment.

FIG. 9 is a flowchart illustrating processing by a status monitor according to a fifth exemplary embodiment.

DESCRIPTION OF THE EMBODIMENTS

Exemplary embodiments of the present disclosure will be described in detail below with reference to the attached drawings. The following exemplary embodiments are not intended to limit the claims, and all combinations of features described in the exemplary embodiments are not necessarily indispensable to the solving means of the present disclosure.

Figure 1:
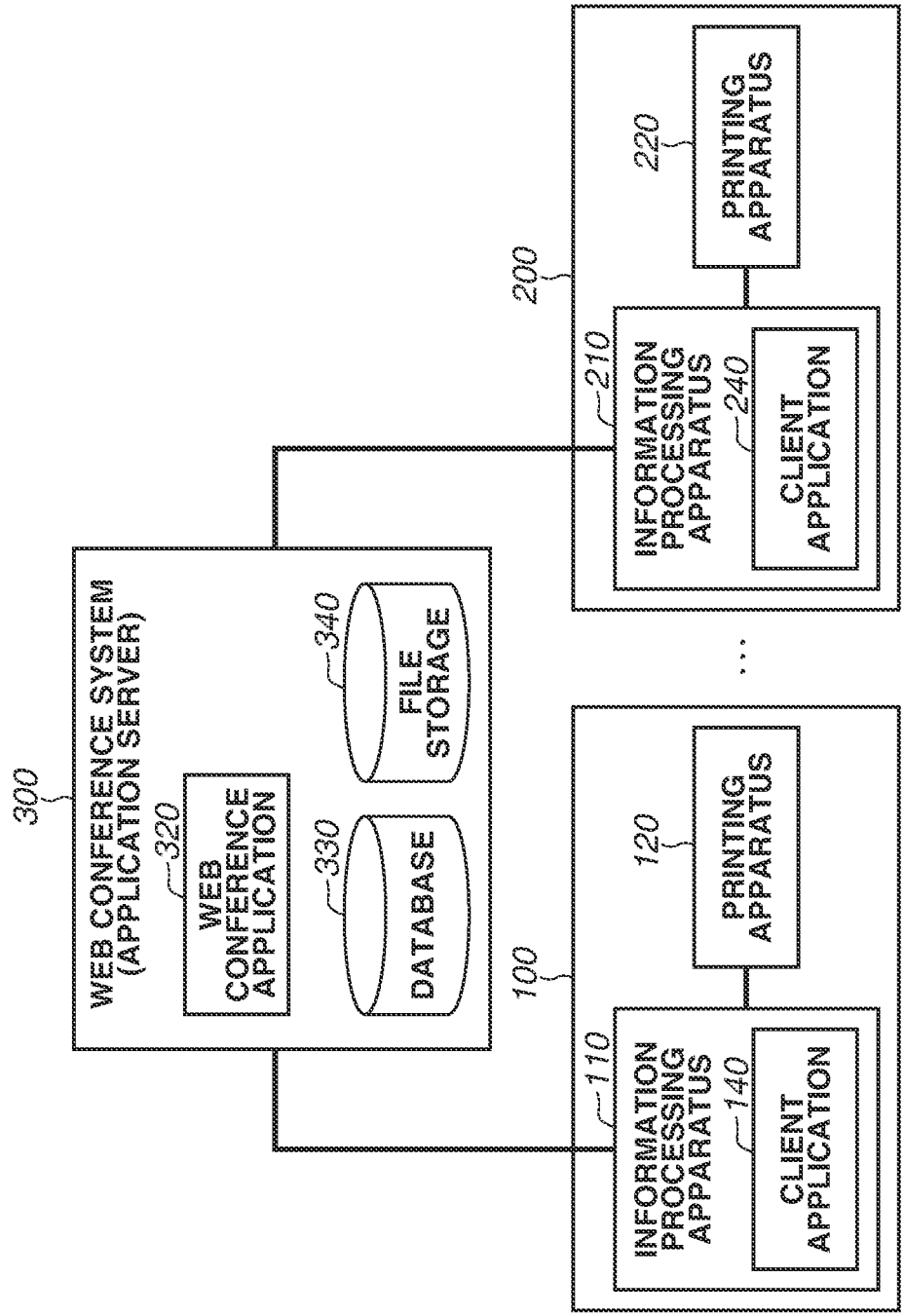
FIG. 1 is a block diagram illustrating a configuration of a web conference system using information processing apparatuses demonstrating an exemplary embodiment.

FIG. 1 is a diagram illustrating an example of a configuration of a web conference system using information processing apparatuses demonstrating a first exemplary embodiment of the present disclosure.

An information processing apparatus system 100 and an information processing apparatus system 200 illustrated in FIG. 1 are systems each including a typical information processing apparatus and peripheral device, for example.

In the information processing apparatus system 100, an information processing apparatus 110 and a printing apparatus 120 are connected using a connection interface, such as a Universal Serial Bus (USB) interface. In the information processing apparatus system 200, an information processing apparatus 210 and a printing apparatus 220 are similarly connected using a connection interface. The information processing apparatuses 110 and 210 are connected to the Internet via respective local area networks.

A web conference system 300 is a web server system on the Internet, and provides a web conference service. The web conference system 300 includes a web conference application 320, a database 330, and a file storage 340.

To connect to the web conference system 300 and hold a web conference, conference participants' information processing apparatuses use a client application supporting the web conference system 300. The participants can join the web conference by installing the predetermined client application on their information processing apparatuses and executing the client application. Client applications 140 and 240 are web conference system client applications corresponding to the web conference system 300. The client application 140 is installed on the information processing apparatus 110. Similarly, the client application 240 is installed on the information processing apparatus 210.

Figure 2:
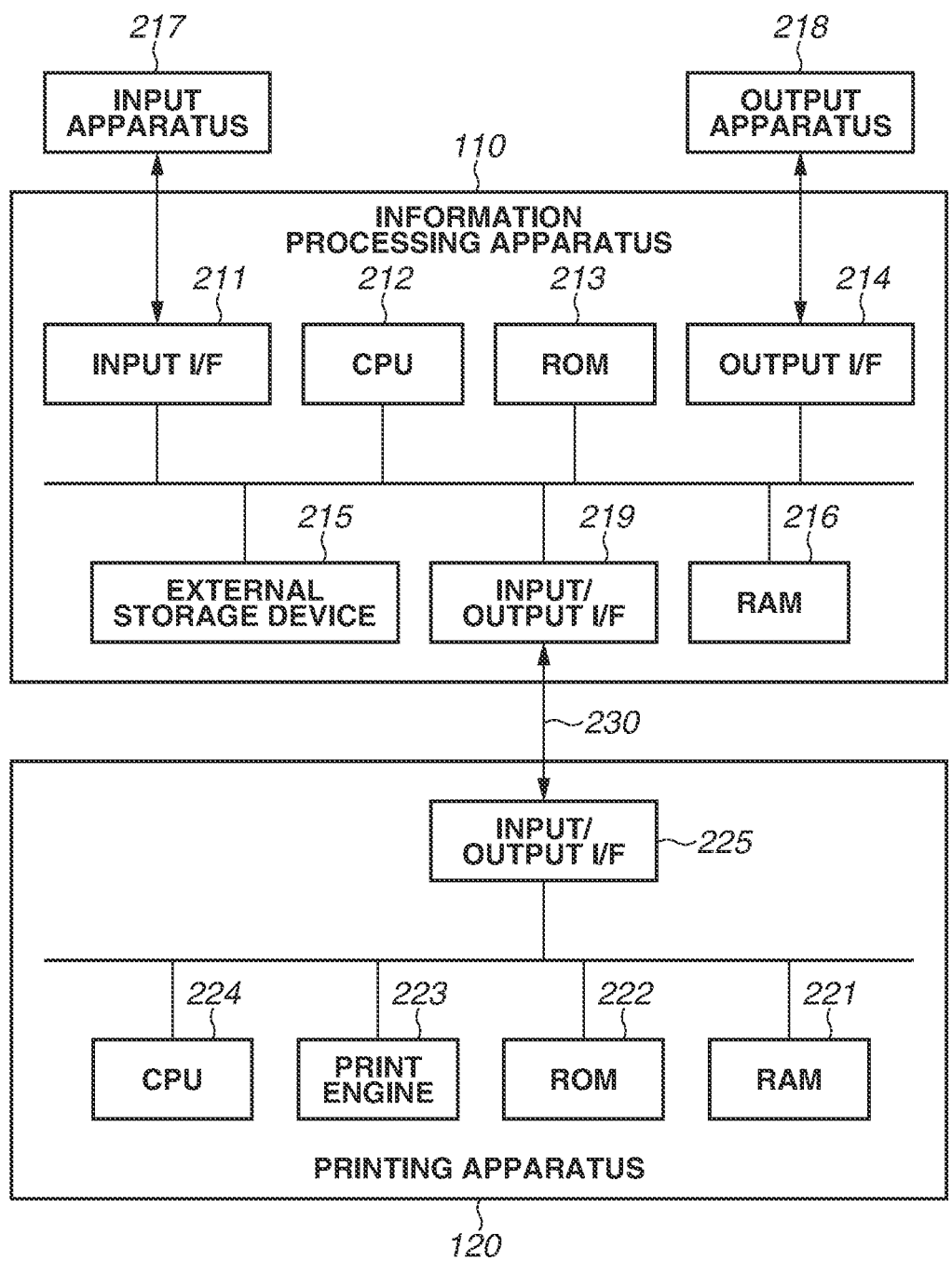
FIG. 2 is a block diagram illustrating a system configuration of an information processing apparatus system according to the exemplary embodiment.

FIG. 2 is a block diagram illustrating an example of a system configuration of the information processing apparatus system 100.

While the configuration of the information processing apparatus system 100 is described here, the information processing apparatus system 200 has a similar configuration to that of the information processing apparatus system 100.

The information processing apparatus 110 will now initially be described.

The information processing apparatus 110 includes an input interface (I/F) 211, a central processing unit (CPU) 212, a read-only memory (ROM) 213, an output OF 214, an external storage device 215, a random access memory (RAM) 216, an input apparatus 217, an output apparatus 218, and an input/output OF 219.

The ROM 213 stores an initialization program. The external storage device 215 stores various programs, including an operating system (OS), the client application 140, and a printer driver, and other various types of data. The RAM 216 is used as a work memory in executing the various programs stored in the external storage device 215. The CPU 212 performs various types of control by reading the programs stored in the ROM 213 and the external storage device 215 into the RAM 216 as appropriate and executing the programs.

The input apparatus 217 connected to the input OF 211 is used to input data and give operation instructions. The input apparatus 217 includes, for example, a keyboard, a pointing device, and an audio input device such as a microphone.

The output apparatus 218 connected to the output OF 214 is used to display data and issue state notifications. The output apparatus 218 includes a display device, such as a display, and an audio output device, such as a speaker and earphones.

The printing apparatus 120 will now be described.

The printing apparatus 120 includes a RAM 221, a ROM 222, a print engine 223, a CPU 224, and an input/output OF 225.

The information processing apparatus 110 and the printing apparatus 120 are connected by a connection OF 230. Examples of the type of connection OF include a network OF for establishing connection via a network, and a USB I/F for establishing a USB connection with a printer. In establishing connection via a network, the network OF can establish direct wireless connection or establish connection via an access point on a wired network. The connection via a network is established using a wireless local area network (LAN) or a wireless LAN, for example. Examples of a communication method for connection may include Wireless Fidelity (Wi-Fi®), Bluetooth®, and near field communication (NFC; International Organization for Standardization/International Electrotechnical Commission [ISO/IEC] 18092). Network I/Fs for respective communication methods and connection methods can be separately prepared.

The RAM 221 is used as a work memory and also as a temporary storage buffer for received data. The ROM 222 stores control commands. The CPU 224 performs various types of control by reading programs stored in the ROM 222 into the RAM 221 as appropriate and executing the programs.

The print engine 223 performs printing based on data stored in the RAM 221. The print engine 223 controls the printing apparatus 120 based on the control commands stored in the ROM 222.

In the present exemplary embodiment, the information processing apparatus 110 and the printing apparatus 120 are described to share the processing in the foregoing manner. However, the mode of processing sharing is not limited thereto.

Figure 3:
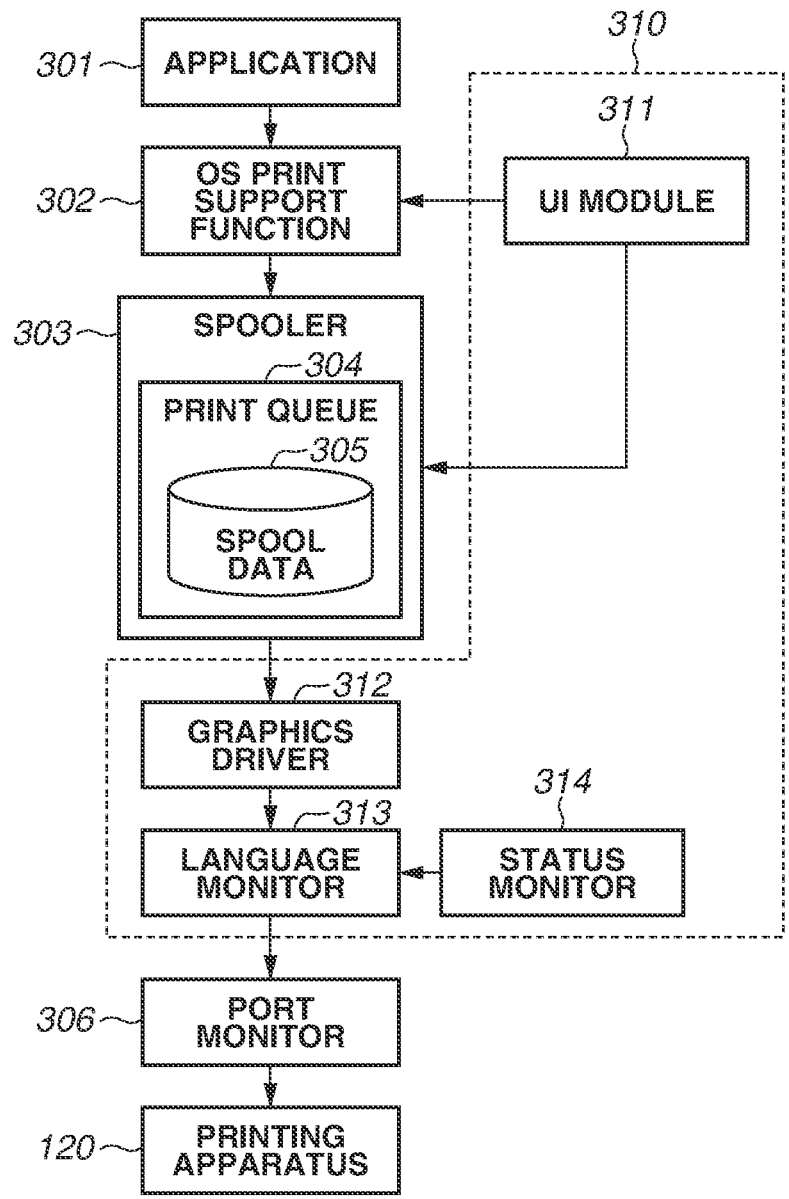
FIG. 3 is a diagram conceptually illustrating a module configuration related to a printer driver.

FIG. 3 is a diagram conceptually illustrating a module configuration related to the printer driver that is a printing system applicable to the information processing apparatus 110.

As illustrated in FIG. 3, a printer driver 310 includes modules, such as a user interface (UI) module 311, a graphics driver 312, a language monitor 313, and a status monitor 314.

An application 301 generates print data, to which print setting information returned from the UI module 311 via an OS print support function 302 is added. The resulting data is temporarily stored in a print queue 304 of a spooler 303 as spool data 305.

The graphics driver 312 converts the spool data 305 into print commands interpretable by the printing apparatus 120. The print commands are output to a port monitor 306 via the language monitor 313.

The port monitor 306 transmits the input print commands to the printing apparatus 120. The status monitor 314 is activated by the UI module 311 when print processing is started, and monitors the status of the printing apparatus 120. If any error occurs in the printing apparatus 120 during the print processing, the status monitor 314 notifies the user of details of the error or a recovery method.

The printing apparatus 120 has at least a standard mode (normal mode) and a silent mode as operation modes in executing a print job. In the silent mode, for example, the level of operation noise occurring from an operation noise generation source is reduced by operating at least some of the operation components in a mode different from in the standard mode.

Figure 4:
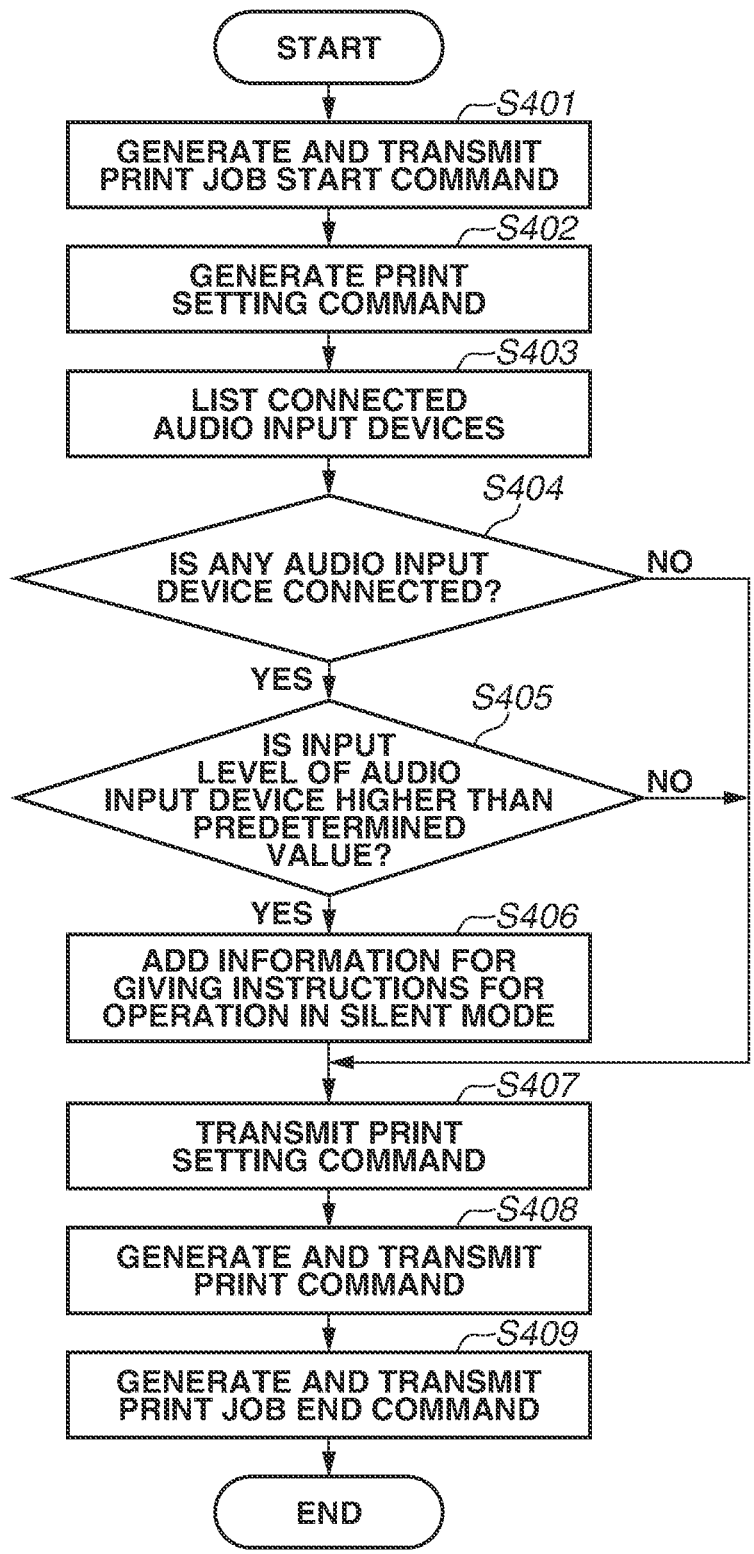
FIG. 4 is a flowchart illustrating processing by a graphics driver according to a first exemplary embodiment.

FIG. 4 is a flowchart for describing processing performed by the graphics driver 312 according to the first exemplary embodiment. In other words, the processing of this flowchart corresponds to processing implemented by the CPU 212 executing a program stored in the external storage device 215.

The processing of this flowchart is started when the spool data 305 is input from the spooler 303 to the graphics driver 312.

In step S401, the graphics driver 312 initially generates a print job start command and transmits the print job start command to the language monitor 313. The print job start command transmitted to the language monitor 313 is transmitted to the printing apparatus 120 via the port monitor 306. Receiving the print job start command, the printing apparatus 120 starts print processing.

In step S402, the graphics driver 312 generates a print setting command.

This print setting command is generated based on the print setting information returned from the UI module 311 via the OS print support function 302. The print setting command includes parameters indicating a sheet type, a sheet size, and an operation mode during the print processing. The printing apparatus 120 performs the print processing based on the parameters.

In step S403, the graphics driver 312 lists audio input devices connected to the information processing apparatus 110.

In step S404, the graphics driver 312 determines whether any audio input device is connected to the information processing apparatus 110 based on the result of the foregoing step S403. If, in step S404, an audio input device is determined to be connected (YES in step S404), the processing proceeds to step S405.

In step S405, the graphics driver 312 determines whether the audio input level (hereinafter, referred to as an input level) of the connected audio input device is higher than a predetermined value. If, in step S405, the input level of the audio input device is determined to be higher than the predetermined value (YES in step S405), the processing proceeds to step S406.

In step S406, the graphics driver 312 adds information for giving instructions for operation in the silent mode to the print setting command generated in the foregoing step S402. In such a case, in step S407, the graphics driver 312 transmits the print setting command including the information for giving instructions for operation in the silent mode to the language monitor 313. If the information for giving instructions for operation in the silent mode is included in the print setting command, the printing apparatus 120 controls the print engine 223 to minimize the operation noise during the print processing.

In contrast, if the determination in the foregoing step S404 or S405 is no (NO in step S404 or S405), the processing proceeds to step S407. In such a case, in step S407, the graphics driver 312 transmits the print setting command generated in the foregoing step S402 to the language monitor 313 without change. In other words, if there is no audio input device connected or the input level is lower than or equal to the predetermined value, the graphics driver 312 transmits the generated print setting command as is to the language monitor 313.

The print setting command transmitted to the language monitor 313 in step S407 is transmitted to the printing apparatus 120 via the port monitor 306 as described above.

In step S408, the graphics driver 312 generates a print command from the spool data 305 and transmits the print command to the language monitor 313. The print command transmitted to the language monitor 313 is transmitted to the printing apparatus 120 via the port monitor 306. The printing apparatus 120 performs print processing by interpreting the print command and operating the print engine 223 based on the content of the print command.

In step S409, the graphics driver 312 generates a print job end command and outputs the print job end command to the language monitor 313. Thereafter, the processing of this flowchart ends. The print job end command transmitted to the language monitor 313 is transmitted to the printing apparatus 120 via the port monitor 306. Receiving the print job end command, the printing apparatus 120 ends the print processing.

By the foregoing processing, the graphics driver 312 automatically gives instructions for operation in the silent mode without user operation by determining the presence or absence of an audio input device connected and the input level thereof. The operation noise of the printing apparatus 120 can thereby be prevented from reaching the call partner through the audio input device. In the case of the operation in the silent mode, the print engine 223 is typically operated at reduced operation speed to reduce the operation noise. The print speed during the operation in the silent mode is thus lower than that in the normal mode. In the present exemplary embodiment, the instructions for operation in the silent mode are issued not only based on the presence or absence of the audio input device but if and only if the input level of the audio input device is higher than the predetermined value in step S405. This can limit the operation in the silent mode to situations where the operation noise of the printing apparatus 120 is likely to be collected by the audio input device. In the present exemplary embodiment, the graphics driver 312 generates the print setting command in step S402, and then in step S406, adds the instructions for operation in the silent mode to the print setting command after the processing of steps S403 to S405. However, the processing order is not limited thereto. For example, the graphics driver 312 can perform the processing of steps S403 to S405 first to determine the presence or absence of instructions for operation in the silent mode before generating a print setting command. Moreover, while the printer driver 310 according to the present exemplary embodiment includes the language monitor 313, a printer driver configured without a language monitor can be employed. In such a case, the various commands generated by the graphics driver 312 in steps S401, S402, S408, and S409 are transmitted not to the language monitor 313 but to the port monitor 306.

The instructions for operation in the silent mode are described to be added to the print setting command if an audio input device is found to be connected to the information processing apparatus 110 and the input level of the connected audio input device is higher than a predetermined value. However, the instructions for operation in the silent mode can be added to the print setting command regardless of the input level if an audio input device is in use by the information processing apparatus 110. The operation noise of the printing apparatus 120 can thereby be prevented from reaching the call partner through the audio input device.

In the first exemplary embodiment, the graphics driver 312 is described to control whether to give instructions for operation in the silent mode depending on the use of an audio input device. A second exemplary embodiment deals with a configuration where a language monitor 313 controls whether to give the instructions for operation in the silent mode depending on the use of an audio input device. In the following description, configurations not mentioned in particular are similar to those of the first exemplary embodiment.

Figure 5:
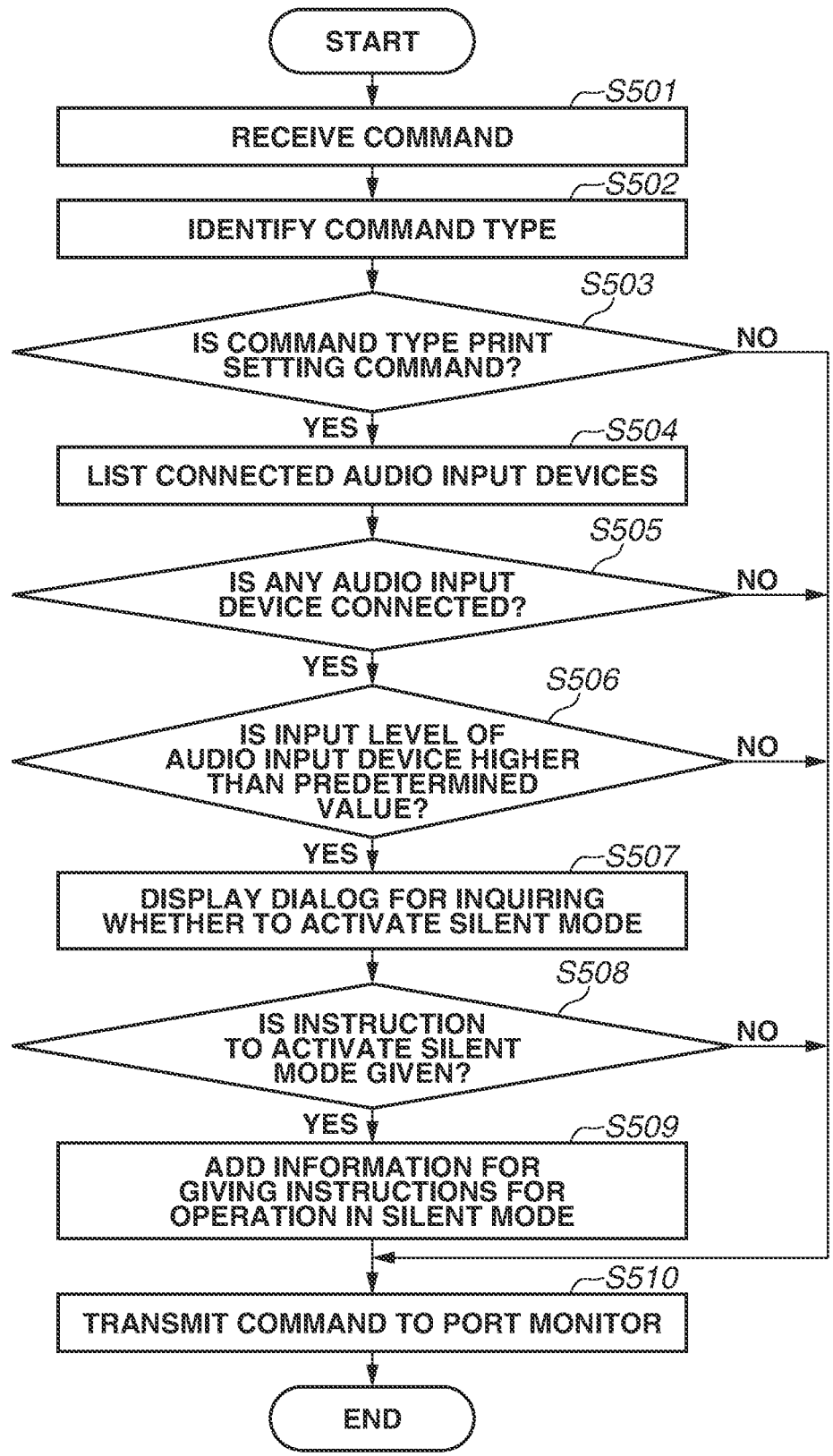
FIG. 5 is a flowchart illustrating processing by a language monitor according to a second exemplary embodiment.

FIG. 5 illustrates a flowchart for describing the processing performed by the language monitor 313 according to the second exemplary embodiment. In other words, the processing of this flowchart corresponds to processing implemented by the CPU 212 executing a program stored in the external storage device 215.

The processing of this flowchart is performed each time a command generated and transmitted by the graphics driver 312 is input to the language monitor 313.

In step S501, the language monitor 313 initially receives the command transmitted from the graphics driver 312.

In step S502, the language monitor 313 performs analysis processing on the content of the command received in the foregoing step S501 to identify the command type.

In step S503, the language monitor 313 determines whether the command type identified in the foregoing step S502 is a print setting command. If, in step S503, the command type is determined to be a print setting command (YES in step S503), the processing proceeds to step S504. In step S504, the language monitor 313 lists audio input devices connected to the information processing apparatus 110.

In step S505, the language monitor 313 determines whether any audio input device is connected to the information processing apparatus 110 based on the result of the foregoing step S504. If, in step S505, an audio input device is determined to be connected (YES in step S505), the processing proceeds to step S506.

In step S506, the language monitor 313 determines whether the input level of the connected audio input device is higher than a predetermined value. If, in step S506, the input level of the audio input device is determined to be higher than the predetermined value (YES in step S506), the processing proceeds to step S507. In step S507, the language monitor 313 displays a dialog for inquiring of the user whether to activate the silent mode. In step S508, the language monitor 313 checks the result of the selection made by the user. Details of the dialog will be described with reference to FIG. 6.

If, in step S508, an instruction to activate the silent mode is given by the user (YES in step S508), the processing proceeds to step S509. In step S509, the language monitor 313 adds information for giving instructions for operation in the silent mode to the print setting command received in the foregoing step S501. In such a case, in step S510, the language monitor 313 transmits the print setting command including the information for giving the instructions for operation in the silent mode to the port monitor 306.

In contrast, if the determination in any one of the foregoing steps S505, S506, and S508 is no (NO in step S505, S506, or S508), the processing proceeds to step S510. In step S510, the language monitor 313 transmits the print setting command received in the foregoing step S501 to the port monitor 306 without change.

If the determination in the foregoing step S503 is no (NO in step S503), the processing proceeds to step S510. In step S510, the language monitor 313 transmits the command received in the foregoing step S501 to the port monitor 306.

As described above, the command transmitted to the port monitor 306 is transmitted to the printing apparatus 120. The printing apparatus 120 performs processing based on the received command.

Figure 6:
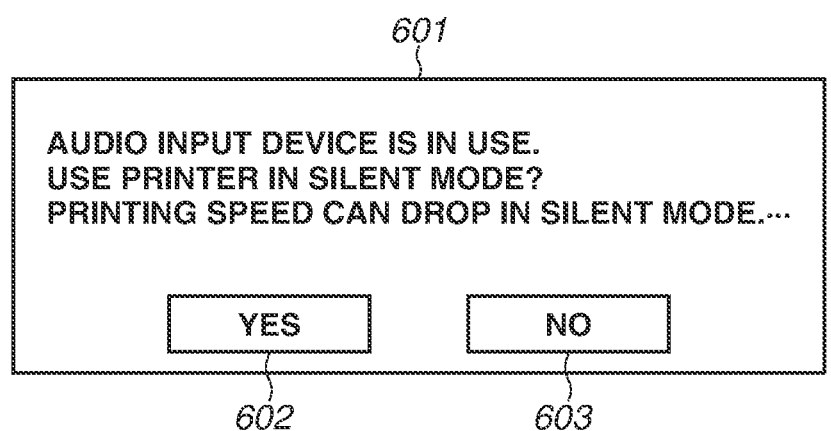
FIG. 6 is a diagram illustrating a dialog displayed by the language monitor according to the second exemplary embodiment.

FIG. 6 is a diagram for describing the dialog displayed on the output apparatus 218 of the information processing apparatus 110 by the processing of step S507 in FIG. 5.

A dialog 601 is displayed by the language monitor 313. The dialog 601 displays a message for inquiring of the user whether to operate the printing apparatus 120 in the silent mode.

A YES button 602 is a button for the user to press in giving instructions for operation in the silent mode. If the user presses the YES button 602, the language monitor 313 executes the processing of step S509 in FIG. 5.

A NO button 603 is a button for the user to press in giving instructions for operation in the normal mode. If the user presses the NO button 603, the language monitor 313 skips the execution of the processing of step S509 in FIG. 5.

By such processing, the language monitor 313 determines whether there is an audio input device connected and the input level thereof, and issues an instruction about whether to operate the printing apparatus 120 in the silent mode based on the determination result. The operation noise of the printing apparatus 120 can thereby be prevented from reaching the call partner via the audio input device. In the case of the operation in the silent mode, the print engine 223 is typically operated at reduced operation speed to reduce the operation noise. The print speed during the operation in the silent mode is thus lower than in the normal mode. In the present exemplary embodiment, the user can select whether to activate the silent mode in step S507 of FIG. 5. This enables the user to select printing at normal speed even when the audio input device is in use. Since the foregoing determination is made by the language monitor 313, whether to give instructions for operation in the silent mode can be made immediately before the command is transmitted to the printing apparatus 120. Whether to give instructions for operation in the silent mode can thus be appropriately made even if the user starts to use an audio input device after the completion of the processing by the graphics driver 312.

While the language monitor 313 displays the dialog for checking whether to activate the silent mode, the dialog display processing can be implemented in cooperation with an application of another process (e.g., the status monitor 314 monitoring the status of the printing apparatus 120). Alternatively, if the printing apparatus 120 does not support the operation in the silent mode, the language monitor 313 can suspend the transmission of the print setting command while the connection of the audio input device is detected. This can prevent the operation noise from reaching the conversation partner, since the printing apparatus 120 not supporting the operation in the silent mode does not start the print processing while the audio input device is connected.

Even if the graphics driver 312 is configured to control the instructions for operation in the silent mode like the first exemplary embodiment, the dialog illustrated in FIG. 6 can be displayed to have the user select whether to operate the printing apparatus 120 in the silent mode.

In the first and second exemplary embodiments, the instructions for operation in the silent mode are described to be controlled depending on the use of an audio input device. A third exemplary embodiment deals with control of the instructions for operation in the silent mode based on the operation mode of the OS. In the following description, configurations not mentioned in particular are similar to those of the first exemplary embodiment.

FIG. 7 is a flowchart for describing processing performed by the graphics driver 312 according to the third exemplary embodiment. In other words, the processing of this flowchart corresponds to processing implemented by the CPU 212 executing a program stored in the external storage device 215.

The processing of this flowchart is started by inputting the spool data 305 from the spooler 303 to the graphics driver 312.

In step S701, the graphics driver 312 initially generates a print job start command and transmits the print job start command to the language monitor 313.

In step S702, the graphics driver 312 generates a print setting command.

In step S703, the graphics driver 312 checks the operation mode of the OS.

In step S704, the graphics driver 312 determines whether the OS is used in a state called "concentration mode" based on the check result of the foregoing step S703. The concentration mode corresponds to the state of the OS where the issuance of sound from applications or notifications from the applications is inhibited to not hinder the user's operation.

If, in the foregoing step S704, the OS is determined to be used in the concentration mode (YES in step S704), the processing proceeds to step S705.

In step S705, the graphics driver 312 adds information for giving instructions for operation in the silent mode to the print setting command generated in the foregoing step S702. In step S706, the graphics driver 312 transmits the print setting command including the information for giving the instructions for operation in the silent mode to the language monitor 313.

In contrast, if, in the foregoing step S704, the OS is determined to not be used in the concentration mode (NO in step S704), the processing proceeds to step S706. In step S706, the graphics driver 312 transmits the print setting command generated in the foregoing step S702 to the language monitor 313 without change.

In step S707, the graphics driver 312 generates a print command from the spool data 305, and outputs the print command to the language monitor 313.

In step S708, the graphics driver 312 generates a print job end command and outputs the print job end command to the language monitor 313. Thereafter, the processing of this flowchart ends.

By performing such processing, the graphics driver 312 automatically issues instructions for operation in the silent mode based on the operation mode of the OS without user operation. This can prevent the operation noise caused by print processing from hindering operation when the user concentrates on the user's operation on the information processing apparatus 110. While the printer driver 310 according to the present exemplary embodiment includes the language monitor 313, a printer driver configured without a language monitor can be employed. In such a case, the various commands and print data generated by the graphics drive 312 in steps S701, S702, S707, and S708 of FIG. 7 are transmitted not to the language monitor 313 but to the port monitor 306.

A fourth exemplary embodiment deals with a control method based on a physical distance between an information processing apparatus and a printing apparatus. In the following description, configurations not mentioned in particular are similar to those of the first exemplary embodiment.

FIG. 8 is a flowchart for describing processing performed by the graphics driver 312 according to the fourth exemplary embodiment. In other words, the processing of this flowchart corresponds to processing implemented by the CPU 212 executing a program stored in the external storage device 215.

The processing of this flowchart is started when the spooler 303 inputs the spool data 305 to the graphics driver 312.

In step S801, the graphics driver 312 initially generates a print job start command and transmits the print job start command to the language monitor 313.

In step S802, the graphics driver 312 generates a print setting command.

In step S803, the graphics driver 312 lists audio input devices connected to the information processing apparatus 110.

In step S804, the graphics driver 312 determines whether any audio input device is connected to the information processing apparatus 110 based on the result of the foregoing step S803. If, in step S804, an audio input device is determined to be connected (YES in step S804), the processing proceeds to step S805.

In step S805, the graphics driver 312 determines whether the input level of the connected audio input device is higher than a predetermined value. If, in step S805, the input level of the audio input device is determined to be higher than the predetermined value (YES in step S805), the processing proceeds to step S806.

In step S806, the graphics driver 312 obtains current location information (coordinate information) about the information processing apparatus 110 and position information (coordinate information) about the printing apparatus 120. Specifically, the graphics driver 312 obtains the current location information about the information processing apparatus 110 using an OS function. The position information about the printing apparatus 120 is registered in the printing apparatus 120 by the user in initial installation operation of the printing apparatus 120. The graphics driver 312 obtains the position information by communicating with the printing apparatus 120. Alternatively, the position information about the printing apparatus 120 can be registered in the printer driver 310 when, for example, the printer driver 310 is installed. The current location information about the information processing apparatus 110 is not limited to the use of the OS function, and can be obtained by any method. For example, the current location information can be separately registered by the user in the information processing apparatus 110 or a not-illustrated server.

In step S807, the graphics driver 312 determines whether the physical distance between the information processing apparatus 110 and the printing apparatus 120 is less than or equal to a specific distance based on the information obtained in the foregoing step S806. If, in step S807, the physical distance is determined to be less than or equal to the specific distance (YES in step S807), the processing proceeds to step S808. In step S808, the graphics driver 312 adds information for giving instructions for operation in the silent mode to the print setting command generated in the foregoing step S802. In such a case, in step S809, the graphics driver 312 transmits the print setting command including the information for giving the instructions for operation in the silent mode to the language monitor 313.

In contrast, if the determination in any of steps S804, S805, and S807 is no (NO in step S804, S805, or S807), the processing proceeds to step S809. In step S809, the graphics driver 312 transmits the print setting command generated in the foregoing step S802 to the language monitor 313 without change.

In step S810, the graphics driver 312 generates a print command from the spool data 305, and outputs the print command to the language monitor 313.

In step S811, the graphics driver 312 generates a print job end command and outputs the print job end command to the language monitor 313. Thereafter, the processing of this flowchart ends.

The print job end command transmitted to the language monitor 313 is transmitted to the printing apparatus 120 via the port monitor 306. Receiving the print job end command, the printing apparatus 120 ends the print processing.

By performing such processing, the graphics driver 312 automatically issues the instructions for operation in the silent mode based on the physical distance between the information processing apparatus 110 and the printing apparatus 120 without user operation. If the information processing apparatus 110 and the printing apparatus 120 are at some physical distance from each other, the operation noise of the printing operation is less likely to be collected by the audio input device even during a call using the audio input device. By making the determination in step S807 of FIG. 8, the silent mode can be activated only if the physical distance between the information processing apparatus 110 and the printing apparatus 120 is less than or equal to the specific distance and the operation noise is likely to be collected. If the operation noise is less likely to be collected, the printing can be performed in the normal mode to avoid a needless drop in the print speed.

If the printing apparatus 120 supports a plurality of silent modes, the silent mode specified by the graphics driver 312 can be switched depending on the physical distance between the information processing apparatus 110 and the printing apparatus 120. More specifically, if the information processing apparatus 110 and the printing apparatus 120 are at a distance as close as possible (within a first distance), the graphics driver 312 specifies a mode for the quietest operation (with the lowest print speed). If the information processing apparatus 110 and the printing apparatus 120 are at some distance (within a second distance, where the second distance>the first distance), the graphics driver 312 specifies a normal silent mode. If the information processing apparatus 110 and the printing apparatus 120 are at a sufficient distance (farther than the second distance), the graphics driver 312 can specify the normal print mode (normal mode).

While the printer driver 310 according to the present exemplary embodiment includes the language monitor 313, a printer driver configured without a language monitor can be employed. In such a case, the various commands and print data generated by the graphics driver 312 in steps S801, S802, S810, and S811 are transmitted not to the language monitor 313 but to the port monitor 306.

In the foregoing third and fourth exemplary embodiments, the graphics driver 312 is described to control the instructions for operation in the silent mode. However, even in the third and fourth exemplary embodiments, like the second exemplary embodiment, the language monitor 313 can be configured to control the instructions for operation in the silent mode.

A fifth exemplary embodiment deals with processing performed by a status monitor 314 serving as a component of a printer driver 310.

The status monitor 314 is activated by a UI module 311 when an application 301 starts print processing. The status monitor 314 regularly obtains status information from a printing apparatus 120, and notifies the user of the status information about the printing apparatus 120 via an output screen. If an error occurs in the printing apparatus 120, the status monitor 314 notifies the user of the error by displaying a dialog indicating the occurrence of the error. Here, if the dialog is displayed at a position highly visible to the user while the user is having a conversation via an audio input device, the user's concentration on the conversation can be disturbed. To address such an issue, the present exemplary embodiment deals with a method for controlling an error notification method of the status monitor 314 depending on whether an audio input device is used. In the following description, configurations not mentioned in particular are similar to those of the first exemplary embodiment.

FIG. 9 is a flowchart for describing the processing performed by the status monitor 314 according to the fifth exemplary embodiment. In other words, the processing of this flowchart corresponds to processing implemented by the CPU 212 executing a program stored in the external storage device 215.

The processing of this flowchart is started when the status monitor 314 is activated by the UI module 311.

In step S901, the status monitor 314 initially determines whether the print processing is completed by the printing apparatus 120 based on the status information obtained from the printing apparatus 120. If the print processing is determined to be completed by the printing apparatus 120 (YES in step S901), the processing of this flowchart ends.

In contrast, if the print processing is determined to not be completed by the printing apparatus 120 (NO in step S901), the processing proceeds to step S902. In step S902, the status monitor 314 obtains the status information about the printing apparatus 120. The status monitor 314 does not have the status information about the printing apparatus 120 immediately after activation. Even in such a case, the status monitor 314 determines that the print processing is not completed by the printing apparatus 120.

In step S903, the status monitor 314 determines whether an error has occurred in the printing apparatus 120 based on the status information obtained in the foregoing step S902. If an error is determined to have occurred (YES in step S903), the processing proceeds to step S904. In step S904, the status monitor 314 lists audio input devices connected to the information processing apparatus 110.

In step S905, the status monitor 314 determines whether any audio input device is connected to the information processing apparatus 110 based on the result of the foregoing step S904. If an audio input device is determined to be connected (YES in step S905), the processing proceeds to step S906. In step S906, the status monitor 314 displays a simplified error notification screen to the user.

In contrast, if no audio input device is determined to be connected (NO in step S905), the processing proceeds to step S907. In step S907, the status monitor 314 displays a detailed error notification screen.

Specific examples of the simplified error notification screen and the detailed error notification screen displayed by the status monitor 314 will be described below with reference to FIGS. 10A and 10B.

After the processing of the foregoing step S906 or S907, the processing returns to step S901.

If no error is determined to have occurred in the printing apparatus 120 (NO in step S903), the processing skips steps S904 to S907 and returns to step S901.

Figure 10A:
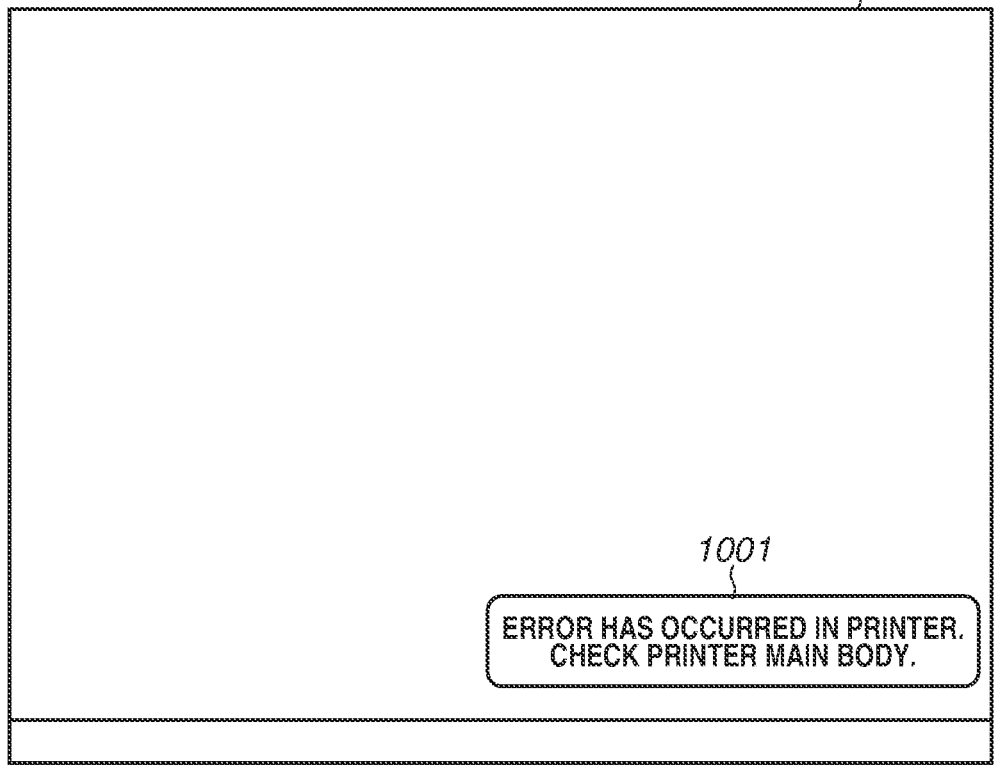
FIGS. 10A and 10B are diagrams illustrating display by the status monitor according to the fifth exemplary embodiment.
Figure 10B:
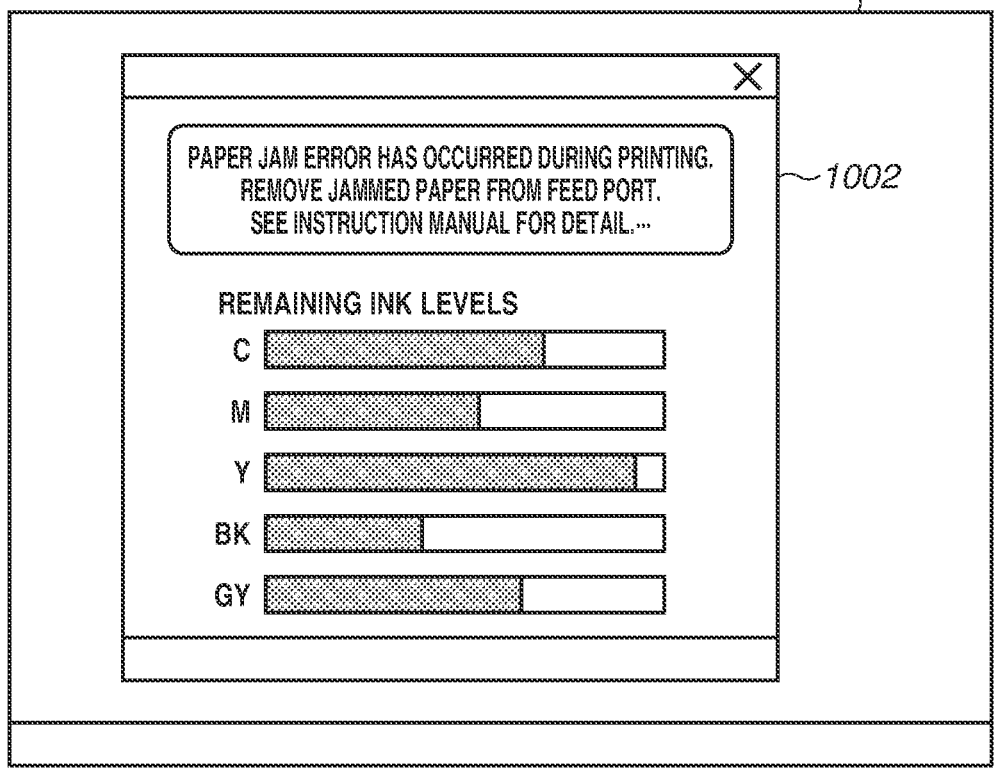

FIGS. 10A and 10B are diagrams illustrating specific examples of the error notification screens displayed by the status monitor 314 on the output apparatus 218.

FIG. 10A illustrates an example of an error notification screen (1001) displayed if an error occurs in the printing apparatus 120 when an audio input device is in use. In other words, this error notification screen corresponds to the simplified error notification screen displayed in step S906 of FIG. 9.

The simplified error notification screen 1001 occupies a minimum area by limiting the information to be notified to the user to only essential information. The simplified error notification screen 1001 is displayed at a position other than the screen center of the output apparatus 218 (e.g., at an end of the screen). Moreover, the simplified error notification screen 1001 is temporarily displayed and automatically hidden after a lapse of a specific time. An example of the simplified error notification screen 1001 is a display called "toast". The use of such a simplified error notification screen 1001 enables notification that an error has occurred in the printing apparatus 120 without disturbing the user's concentration on the conversation even if the error notification is displayed during the conversation.

FIG. 10B illustrates an example of a detailed error notification screen 1002 displayed if an error occurs in the printing apparatus 120 without any audio input device in use. In other words, this error notification screen corresponds to the detailed error notification screen displayed in step S907 of FIG. 9.

The detailed error notification screen 1002 describes the content of the error that has occurred in the printing apparatus 120 as well as a recovery procedure. The remaining levels of inks attached to the printing apparatus 120 can also be checked at the same time. The detailed error notification screen 1002 is displayed at the screen center of the output apparatus 218, whereby the user can be notified of the information about the error without missing the error information. The display position of the detailed error notification screen 1002 is not limited to the screen center and can be any position.

By such processing, the status monitor 314 can switch the display method of the screen for notifying the user of the error state of the printing apparatus 120 depending on whether an audio input device is connected. More specifically, if the user is having a conversation via the audio input device when an error occurs in the printing apparatus 120, the simplified error notification screen 1001 can be displayed to avoid disturbance to the user's concentration on the conversation.

A sixth exemplary embodiment deals with a method for giving instructions for a silent mode during an operation of transmitting and receiving print data between conference participants via client applications of a web conference system (hereinafter, may be referred to as "mutual printing").

Figure 11:
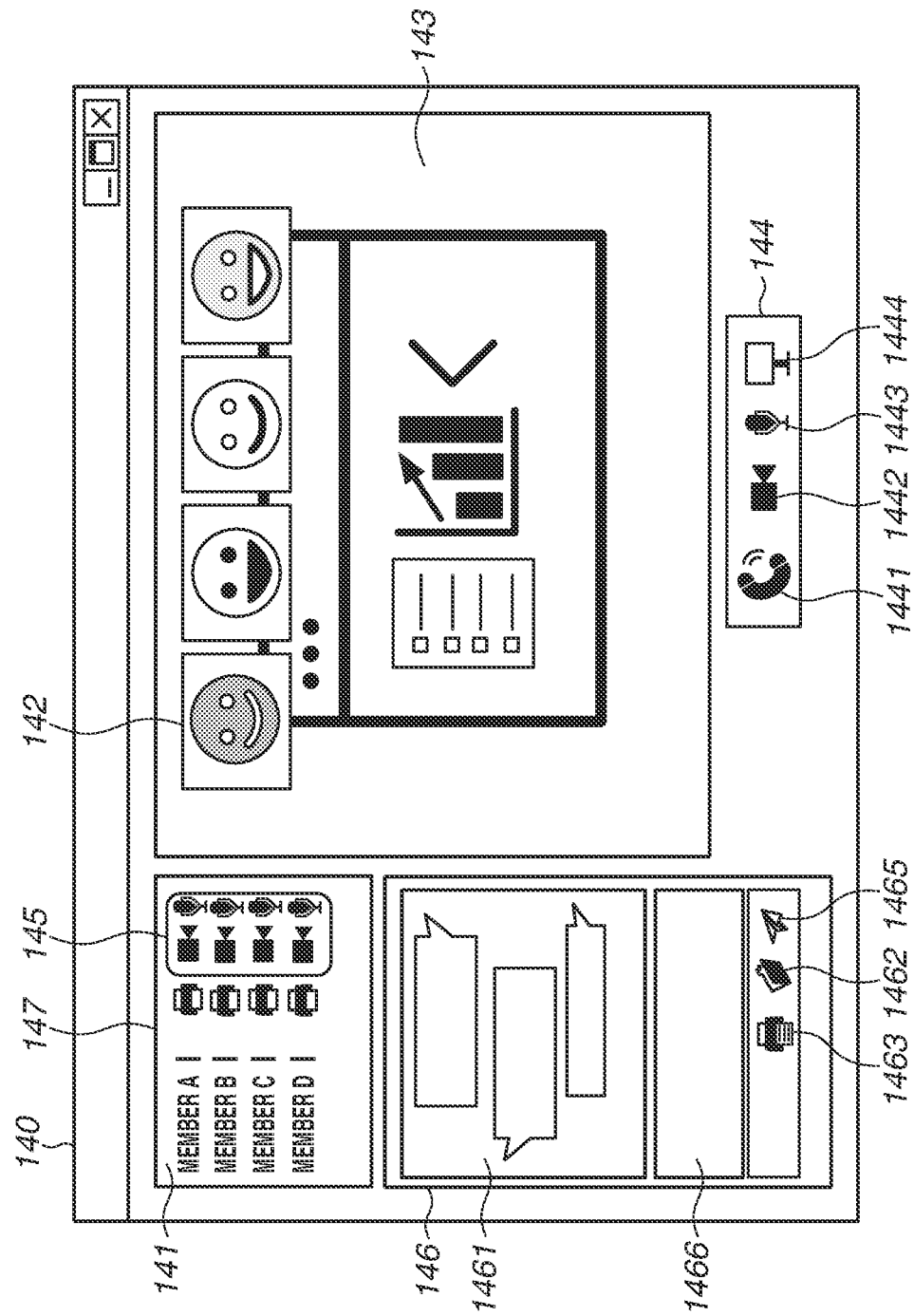
FIG. 11 is a diagram illustrating a main screen of a client application of a web conference system according to a sixth exemplary embodiment.

FIG. 11 is a diagram illustrating a main screen of a client application 140 of the web conference system, running on an information processing apparatus 110 according to the sixth exemplary embodiment. While a description will be given by using the client application 140, the same applies to a client application 240.

On the main screen of the client application 140, a window 141 displays a list of members participating in the web conference and the device statuses of the respective members.

Display sections 142 display video screens of the members participating in the web conference. The video images of the participants are distributed to the participants via cameras connected to the members' computers.

A window 143 is a window where a desktop screen of a member given a display right among the members participating in the web conference is distributed to the conference participants to be displayed. In giving a presentation, the presenter distributes a presentation screen by obtaining a desktop display right, displaying presentation content displayed on the presenter's own computer on the desktop screen, and distributing and displaying the desktop screen.

A control switch section 144 includes control switches 1441 to 1444. The control switch 1441 is a switch for controlling the participant's own participation into and exit from the web conference. The control switch 1442 is a switch for controlling a video distribution function of an image captured by the participant's own camera on and off. The control switch 1443 is a switch for controlling a voice call function on and off. The control switch 1444 is a switch for controlling a desktop sharing function on and off.

A status display section 145 displays the on/off states of, for example, video distribution, voice call, and desktop sharing functions of each conference participant that are controlled based on the operations of the control switch section 144.

A display section 147 displays the statuses of printers used for mutual printing in the web conference system. The display section 147 displays the statuses of the printers connected to the respective conference participants' client applications.

An operation screen 146 is an operation screen for transmitting and receiving text messages, files, scan images, and print data between the participants holding the web conference.

A message display section 1461 displays the contents of mutual communications in transmitting and receiving the text messages, files, scan images, and print data between the participants.

A file selection button 1462 is a button for selecting a target file or files in performing file transmission and reception.

A print data selection button 1463 is a button used for mutual printing in the web conference system. The print data selection button 1463 is a button for selecting target print data for mutual printing.

A message input dialog box 1466 is intended to input a text message in transmitting the text message.

A transmission button 1465 is a button for transmitting text messages, files, scan images, and print data.

An operation for performing mutual printing between the conference participants via the client applications of the web conference system will now be described.

A description will be given by using a case where participant A participating in a web conference using the information processing apparatus system 100 shares a file stored in the participant A's own information processing apparatus 110 with participant B participating in the web conference using the information processing apparatus system 200 in the form of a paper medium printout during the web conference.

Examples of the use case where information is shared in the form of a paper medium include a case where the information is desirably shared in the form of a printout because of security reasons for preventing leakage of digital information. Another example is a case where the information is desirably shared in the form of a printout because the viewability on the computer screen is so low that the working efficiency can be affected, like table data having many rows and columns and multi-page document data.

The operation by participant A will initially be described.

The operation screen 146 on the client application 140 of the information processing apparatus system 100 serves as an operation screen for transmitting and receiving text messages, files, scan images, and print data between the participants holding the web conference. The display section 147 displays the statuses of the printers used for mutual printing in the web conference system. The display section 147 displays the statuses of the printers connected to the respective conference participants' client applications.

Participant A selects participant B (member B) from the participant list and presses "Member B" to hold a chat session between participants A and B. The operation screen 146 is displayed as their chat session window. Participants A and B operate the operation screen 146, whereby participant A can have a text chat with, transmit a file to, and make a printout for participant B, and vice versa.

The behavior of the information processing apparatus system 200 of participant B will now be described.

When participant A starts the foregoing chat session with participant B, a chat session window with participant A is similarly displayed on the client application 240 of participant B. Using this chat session window, participant B can have a text chat with, transmit a file to, and make a printout for participant A.

Suppose that participant A selects a file as print data and performs a transmission print operation on the file in such a state. The information processing apparatus system 100 transmits the print data to the client application 240 of the information processing apparatus system 200 via the web conference system 300.

On the chat window of the client application 240 of participant B, a chat message notifying that the print data has been transmitted from participant A is displayed. The print data received by the client application 240 from the web conference system 300 is input to the printer driver of a target printer set in advance (here, printing apparatus 220), and printed out by the printing apparatus 220 based on the OS's standard printing method. Here, before the printout, the client application 240 of participant B displays a dialog for confirming whether to print the print data transmitted from participant A in the "silent mode".

Figure 12:
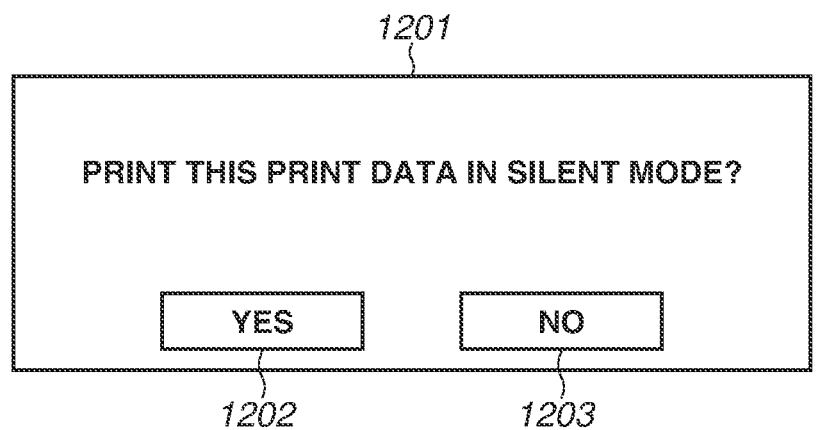
FIG. 12 is a diagram illustrating a confirmation dialog displayed by the client application according to the sixth exemplary embodiment.

FIG. 12 is a diagram for describing the confirmation dialog displayed by the client application 240 according to the sixth exemplary embodiment.

A message dialog 1201 displays a message "Print this print data in silent mode?"

If participant B presses a "YES" button 1202, the printer driver processing the print data adds information for giving instructions for operation in the silent mode to a print setting command, and transmits the print setting command to the printing apparatus 220.

If participant B presses a "NO" button 1203, the printer driver processing the print data generates a print setting command for giving instructions for a print operation in the normal mode, and transmits the print setting command to the printing apparatus 220.

With the foregoing configuration, if the conference participants perform mutual printing with each other via the client applications of the web conference system, the recipient of the print data can select the operation mode during printing based on the recipient's own situation. More specifically, if the recipient of the print data wants to print the received print data while having a conversation with the other conference participants, the operation in the silent mode can be selected to prevent the operation noise during printing from disturbing the conversation.

In the second and fifth exemplary embodiments, the dialog is configured to be displayed to have the user select whether to print in the silent mode at the timing of printing. However, a configuration to preset whether to use the silent mode when an audio input device is in use or when the OS is in the concentration mode is also included in the present disclosure.

In the foregoing exemplary embodiments, the printing apparatuses are described as examples of the peripheral devices. However, an exemplary embodiment of the present disclosure is also applicable to peripheral devices other than printing apparatuses. For example, if an audio input device is in use by an information processing apparatus, the information processing apparatus instructs a peripheral device to which a job is transmitted to operate in a silent mode to reduce the operation noise caused by the peripheral device processing the job. If the OS is in the concentration mode, the information processing apparatus also instructs the peripheral device to operate in the silent mode. The information processing apparatus further instructs the peripheral device to operate in the silent mode depending on the distance between the information processing apparatus and the peripheral device.

According to the exemplary embodiments, peripheral device control to not disturb voice communication is thus implemented even with ordinary peripheral devices without a special mechanism. For example, when an information processing apparatus performs printing, the information processing apparatus determines whether an audio input device is connected and the input level thereof, and automatically issues instructions for operation in the silent mode without user operation. This can prevent the operation noise of the printing apparatus from reaching the conversation partners via the audio input device.

It will be understood that the configurations and content of the foregoing various types of data are not limited thereto, and various configurations and content can be employed depending on the applications and use purposes.

While some exemplary embodiments have been described, exemplary embodiments of the present disclosure can be implemented as a system, an apparatus, a method, a program, and/or a storage medium, for example. Specifically, an exemplary embodiment of the present disclosure can be applied to a system including a plurality of devices, or an apparatus including a single device.

All combinations of the foregoing exemplary embodiments are also included in the present disclosure.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-094073, which was filed on Jun. 10, 2022 and which is hereby incorporated by reference herein in its entirety.

What is claimed is:

1. An information processing apparatus configured to transmit a print job to a printing apparatus, the information processing apparatus comprising:
one or more memories; and
one or more processors,
wherein the one or more processors and the one or more memories are configured to instruct, if an audio input device is connected to the information processing apparatus, an audio input level of the audio input device is higher than a predetermined level, and an operating system (OS) running on the information processing apparatus is set to a concentration mode, the printing apparatus to which the print job is transmitted to operate in a silent mode to reduce operation noise occurring in performing the print job, and to not instruct, if the audio input device is not connected to the information processing apparatus, the printing apparatus to operate in the silent mode, wherein the concentration mode corresponds to a state of the operating system (OS) where issuance of sound from applications or notifications from the applications is inhibited.

2. The information processing apparatus according to claim 1, wherein the one or more processors and the one or more memories are further configured to:
select whether to operate the printing apparatus processing the print job in the silent mode, and
if the audio input device is connected to the information processing apparatus and the printing apparatus is selected to be operated in the silent mode, instruct the printing apparatus to which the print job is transmitted to operate in the silent mode.

3. The information processing apparatus according to claim 1,
wherein the one or more processors and the one or more memories are further configured to:
obtain a physical distance between the information processing apparatus and the printing apparatus; and
if the audio input device is connected to the information processing apparatus and the physical distance between the information processing apparatus and the printing apparatus is less than or equal to a predetermined distance, instruct the printing apparatus to which the print job is transmitted to operate in the silent mode.

4. The information processing apparatus according to claim 1, wherein the one or more processors and the one or more memories are further configured to:
obtain status information about the printing apparatus;
notify a user of the status information via an output screen of the information processing apparatus; and
if the audio input device is connected to the information processing apparatus, limit information to be notified via the output screen.

5. The information processing apparatus according to claim 4, wherein the one or more processors and the one or more memories are further configured to, if the audio input device is connected to the information processing apparatus, control display of the information to be notified at an end of the output screen.

6. The information processing apparatus according to claim 5, wherein the one or more processors and the one or more memories are further configured to, if the audio input device is connected to the information processing apparatus, hide the information notified via the output screen based on a lapse of a specific time.

7. The information processing apparatus according to claim 1, wherein the one or more processors and the one or more memories are further configured to:
participate in a web conference held by a web conference system;
receive print job data transmitted from another information processing apparatus participating in the web conference via the web conference system; and
if the print job data is received via the web conference system, instruct the printing apparatus to which a print job based on the print job data is transmitted to operate in the silent mode to reduce the operation noise occurring in performing the print job based on the print job data.

8. The information processing apparatus according to claim 7, wherein the one or more processors and the one or more memories are further configured to:
obtain a user selection of whether to operate the printing apparatus processing the print job data received via the web conference system in the silent mode; and
if the printing apparatus is selected to be operated in the silent mode by the user selection, instruct the printing apparatus to which the print job based on the print job data received via the web conference system is transmitted to operate in the silent mode.

9. A method for controlling an information processing apparatus configured to transmit a print job to a printing apparatus, the method comprising:
if an audio input device is connected to the information processing apparatus, an audio input level of the audio input device is higher than a predetermined level, and an operating system (OS) running on the information processing apparatus is set to a concentration mode, instructing the printing apparatus to which the print job is transmitted to operate in a silent mode to reduce operation noise occurring in performing the print job; and
if the audio input device is not connected to the information processing apparatus, not instructing the printing apparatus to operate in the silent mode,
wherein the concentration mode corresponds to a state of the operating system (OS) where issuance of sound from applications or notifications from the applications is inhibited.

10. A non-transitory computer-readable medium storing instructions that, when executed by an information processing apparatus, cause the information processing apparatus to perform operations comprising:
if an audio input device is connected to the information processing apparatus, an audio input level of the audio input device is higher than a predetermined level, and an operating system (OS) running on the information processing apparatus is set to a concentration mode, instructing a printing apparatus to which the information processing apparatus transmits a print job to operate in a silent mode to reduce operation noise occurring in performing the print job; and
if the audio input device is not connected to the information processing apparatus, not instructing the printing apparatus to operate in the silent mode,
wherein the concentration mode corresponds to a state of the operating system (OS) where issuance of sound from applications or notifications from the applications is inhibited.

* * * * *